United States Patent
Norvell et al.

(10) Patent No.: US 12,236,967 B2
(45) Date of Patent: *Feb. 25, 2025

(54) AUDIO CODING METHOD AND APPARATUS

(71) Applicant: Telefonaktiebolaget LM Ericsson (publ), Stockholm (SE)

(72) Inventors: Erik Norvell, Stockholm (SE); Volodya Grancharov, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 657 days.

This patent is subject to a terminal disclaimer.

(21) Appl. No.: 16/722,569

(22) Filed: Dec. 20, 2019

(65) Prior Publication Data

US 2020/0126573 A1 Apr. 23, 2020

Related U.S. Application Data

(63) Continuation of application No. 16/167,831, filed on Oct. 23, 2018, now Pat. No. 10,553,227, which is a
(Continued)

(51) Int. Cl.
*G10L 19/002* (2013.01)
*G10L 19/02* (2013.01)
(Continued)

(52) U.S. Cl.
CPC ........ *G10L 19/028* (2013.01); *G10L 19/0204* (2013.01); *G10L 19/038* (2013.01);
(Continued)

(58) Field of Classification Search
None
See application file for complete search history.

(56) References Cited

U.S. PATENT DOCUMENTS 5,263,119 A 11/1993 Tanaka et al.
8,396,707 B2 * 3/2013 Vaillancourt ........... G10L 19/24
704/219
(Continued)

FOREIGN PATENT DOCUMENTS

CN 101853663 A * 10/2010

OTHER PUBLICATIONS

Translation of CN-101853663-A. (Year: 2010).*
(Continued)

*Primary Examiner* — Richard Z Zhu
(74) *Attorney, Agent, or Firm* — Sage Patent Group

(57) ABSTRACT

An audio signal, having first and second regions of frequency spectrum, is coded. Spectral peaks in the first region are encoded by a first coding method. For a segment of the audio signal, a relation between energy of bands in the first and second regions is determined. A relation between the energy of the band in the second region and energy of neighboring bands in the second region is determined. A determination is made whether available bits are sufficient for encoding at least one non-peak segment of the first region and the band in the second region. Responsive to first and second relations fulfilling a respective predetermined criterion and a sufficient number of bits, encoding the band in the second region using a second coding method different from the first coding method, and otherwise, subjecting the band in the second region to BandWidth Extension BWE or noise fill.

20 Claims, 9 Drawing Sheets

Related U.S. Application Data continuation of application No. 15/655,252, filed on Jul. 20, 2017, now Pat. No. 10,147,435, which is a continuation of application No. 14/440,700, filed as application No. PCT/EP2015/055306 on Mar. 13, 2015, now Pat. No. 9,741,349.

(60) Provisional application No. 61/953,331, filed on Mar. 14, 2014.

(51) Int. Cl.
| | |
|---|---|
| *G10L 19/028* | (2013.01) |
| *G10L 19/038* | (2013.01) |
| *G10L 25/51* | (2013.01) |
| *G10L 19/18* | (2013.01) |
| *G10L 25/06* | (2013.01) |
| *G10L 25/18* | (2013.01) |
| *G10L 25/21* | (2013.01) |
| *H04L 12/70* | (2013.01) |

(52) U.S. Cl.
CPC ............ *G10L 25/51* (2013.01); *G10L 19/002* (2013.01); *G10L 19/02* (2013.01); *G10L 19/18* (2013.01); *G10L 25/06* (2013.01); *G10L 25/18* (2013.01); *G10L 25/21* (2013.01); *H04L 2012/5632* (2013.01)

(56) References Cited

U.S. PATENT DOCUMENTS

| | | | |
|---|---|---|---|
| 8,463,599 B2 | 6/2013 | Ramabadran et al. | |
| 8,494,864 B2 * | 7/2013 | Grancharov | G10L 19/22 |
| | | | 704/200 |
| 8,515,742 B2 * | 8/2013 | Gao | G10L 19/24 |
| | | | 704/207 |
| 8,600,765 B2 | 12/2013 | Liu et al. | |
| 8,918,314 B2 | 12/2014 | Oshikiri et al. | |
| 9,280,980 B2 | 3/2016 | Grancharov et al. | |
| 9,384,749 B2 | 7/2016 | Kawashima et al. | |
| 9,437,202 B2 | 9/2016 | Näslund et al. | |
| 9,437,204 B2 | 9/2016 | Grancharov et al. | |
| 9,741,356 B2 | 8/2017 | Kawashima et al. | |
| 2003/0021295 A1 | 1/2003 | Sahinoglu et al. | |
| 2007/0016414 A1 | 1/2007 | Mehrotra et al. | |
| 2007/0147518 A1 * | 6/2007 | Bessette | G10L 19/0212 |
| | | | 375/243 |
| 2008/0312758 A1 | 12/2008 | Koishida et al. | |
| 2011/0153336 A1 * | 6/2011 | Grancharov | G10L 19/22 |
| | | | 704/500 |
| 2012/0029923 A1 | 2/2012 | Rajendran et al. | |
| 2013/0018660 A1 | 1/2013 | Qi et al. | |
| 2013/0110522 A1 | 5/2013 | Choo et al. | |
| 2013/0117015 A1 | 5/2013 | Bayer et al. | |
| 2013/0226597 A1 | 8/2013 | Kjoerling et al. | |
| 2013/0282368 A1 | 10/2013 | Choo et al. | |
| 2013/0290003 A1 | 10/2013 | Choo | |
| 2014/0200901 A1 | 7/2014 | Kawashima et al. | |
| 2015/0162011 A1 | 6/2015 | Qi et al. | |
| 2015/0287417 A1 | 10/2015 | Disch et al. | |
| 2017/0092282 A1 | 3/2017 | Choo et al. | |
| 2017/0178638 A1 | 6/2017 | Naslund et al. | |

OTHER PUBLICATIONS

International Preliminary Report on Patentability Corresponding to International Application No. PCT/EP2015/055306, mailed Jun. 3, 2016, 15 pages.

International Search Report and Written Opinion of the International Searching Authority for International Application No. PCT/EP2014/055306, mailed May 27, 2015, 12 pages.

3GPP, "MDCT Coding Mode", Section 5.3 of Technical Specification, "3rd Generation Partnership Project; Technical Specification Group Services and System Aspects; Codec for Enhanced Voice Services (EVS); Detailed Algorithmic Description (Release 12)", 3GPP TS 26.445 V1.1.0 (Sep. 2014), pp. 270-408.

ETSI TS 126 445 v 12.0.0., "UTMS; LTE; EVS Codec detailed algorithmic description (3GPP TS 26.445 sections 5.3.4.2.5, 5.3.4.2.7)", pp. 380-383 and pp. 391-400.

\* cited by examiner

AUDIO CODING METHOD AND APPARATUS

CROSS REFERENCE TO RELATED APPLICATIONS

This application is a continuation of U.S. patent application Ser. No. 16/167,831 filed Oct. 23, 2018 (now U.S. Pat. No. 10,553,227), which is a continuation of U.S. patent application Ser. No. 15/655,252 filed Jul. 20, 2017 (now U.S. Pat. No. 10,147,435), which is a continuation of U.S. patent application Ser. No. 14/440,700 filed May 5, 2015 (now U.S. Pat. No. 9,741,349), which itself is a 35 U.S.C. § 371 national stage application of PCT International Application No. PCT/EP2015/055306, filed in the English language on Mar. 13, 2015, which itself claims the benefit of U.S. provisional Patent Application No. 61/953,331, filed Mar. 14, 2014, the disclosures and contents of each of which are incorporated by reference herein in their entirety.

TECHNICAL FIELD

The proposed technology generally relates to encoders and methods for audio encoding.

Embodiments herein generally relate to audio coding where parts of the spectrum cannot be encoded due to bitrate constraints. In particular, it relates to bandwidth extension technologies where a perceptually less important band is reconstructed using e.g. a parametric representation and approximations from an encoded perceptually more important band.

BACKGROUND

Most existing telecommunication systems operate on a limited audio bandwidth. Stemming from the limitations of the land-line telephony systems, most voice services are limited to only transmitting the lower end of the spectrum. Although the limited audio bandwidth is enough for most conversations, there is a desire to increase the audio bandwidth to improve intelligibility and sense of presence. Although the capacity in telecommunication networks is continuously increasing, it is still of great interest to limit the required bandwidth per communication channel. In mobile networks smaller transmission bandwidths for each call yields lower power consumption in both the mobile device and the base station. This translates to energy and cost saving for the mobile operator, while the end user will experience prolonged battery life and increased talk-time. Further, with less consumed bandwidth per user the mobile network can service a larger number of users in parallel.

A property of the human auditory system is that the perception is frequency dependent. In particular, our hearing is less accurate for higher frequencies. This has inspired so called bandwidth extension (BWE) techniques, where a high frequency band is reconstructed from a low frequency band using a low number of transmitted parameters.

The conventional BWE uses a parametric representation of the high band signal, such as spectral envelope and temporal envelope, and reproduces the spectral fine structure of the signal by using generated noise or a modified version of the low band signal. If the high band envelope is represented by a filter, the fine structure signal is often called the excitation signal. An accurate representation of the high band envelope is perceptually more important than the fine structure. Consequently, it is common that the available resources in terms of bits are spent on the envelope representation while the fine structure is reconstructed from the coded low band signal without additional side information.

The technology of BWE has been applied in a variety of audio coding systems. For example, the 3GPP AMR-WB+ uses a time domain BWE based on a low band coder which switches between Code Excited Linear Predictor (CELP) speech coding and Transform coded residual (TCX) coding. Another example is the 3GPP eAAC transform based audio codec which performs transform domain variant of BWE called Spectral Band Replication (SBR).

Although the split into a low band and a high band is often perceptually motivated, it may be less suitable for certain types of signals. As an example, if the high band of a particular signal is perceptually more important than the lower band, the majority of the bits spend on the lower band will be wasted while the higher band will be represented with poor accuracy. In general, if a portion of the spectrum is fixed to be encoded while other parts are not encoded, there may always be signals which do not fit the a-priori assumption. The worst scenario would be that the entire energy of the signal is contained in the non-coded part which would yield very poor performance.

SUMMARY

It is an object to provide more flexible audio coding schemes. This and other objects are met by embodiments of the proposed technology.

The proposed technology relates to adding decision logic for including a band or bands, a-priori assumed to be non-important, into the fine structure encoding. The decision logic is designed to maintain the "conventional" behavior for signals where the a-priori assumption for the boundaries of coded and BWE regions is valid, while including parts of the a-priori assumed non-important BWE region in the coded region for signals which fall outside of this group.

An advantage of the proposed technology is to maintain the beneficial structure of a partially encoded band based on a-priori knowledge while extending it to handle specific cases of signals.

Other advantages will be appreciated when reading the detailed description.

According to a first aspect, a method is provided for encoding an audio signal, where a frequency spectrum of the audio signal is divided into at least a first and a second region, where at least the second region comprises a number of bands. Further, spectral peaks in the first region are encoded by a first coding method. The method provided herein comprises: for a segment of the audio signal: determining a relation between an energy of a band in the second region and an energy estimate of the first region. The method further comprises determining a relation between the energy of the band in the second region and an energy of neighboring bands in the second region. The method further comprises determining whether an available number of bits is sufficient for encoding at least one non-peak segment of the first region and the band in the second region. Further, when the relations fulfill a respective predetermined criterion and the number of bits is sufficient, the band in the second region and the at least one segment of the first region are encoded using a second coding method. Otherwise, the band in the second region is instead subjected to BWE or noise fill.

According to a second aspect, an encoder is provided for encoding an audio signal, where a frequency spectrum of the audio signal is divided into at least a first and a second region, where at least the second region comprises a number of bands. The encoder is configured to encode spectral peaks in the first region using a first coding method. The encoder is further configured to: for a segment of the audio signal: determine a relation between an energy of a band in the second region and an energy estimate of the first region; to determine a relation between the energy of the band in the second region and an energy of neighboring bands in the second region; to determine whether an available number of bits is sufficient for encoding at least one non-peak segment of the first region and the band in the second region. The encoder is further configured to: when the relations fulfill a respective predetermined criterion and the number of bits is sufficient: encode the band in the second region and the at least one segment of the first region using a second coding method, and otherwise, to subject the band in the second region to Extension BWE or noise fill.

According to a third aspect, a communication device is provided, which comprises an encoder according to the second aspect.

According to a fourth aspect, a computer program is provided, which comprises instructions which, when executed on at least one processor, cause the at least one processor to carry out the method according to the first and/or second aspect.

According to an fifth aspect, a carrier is provided, which contains the computer program of the fourth aspect.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
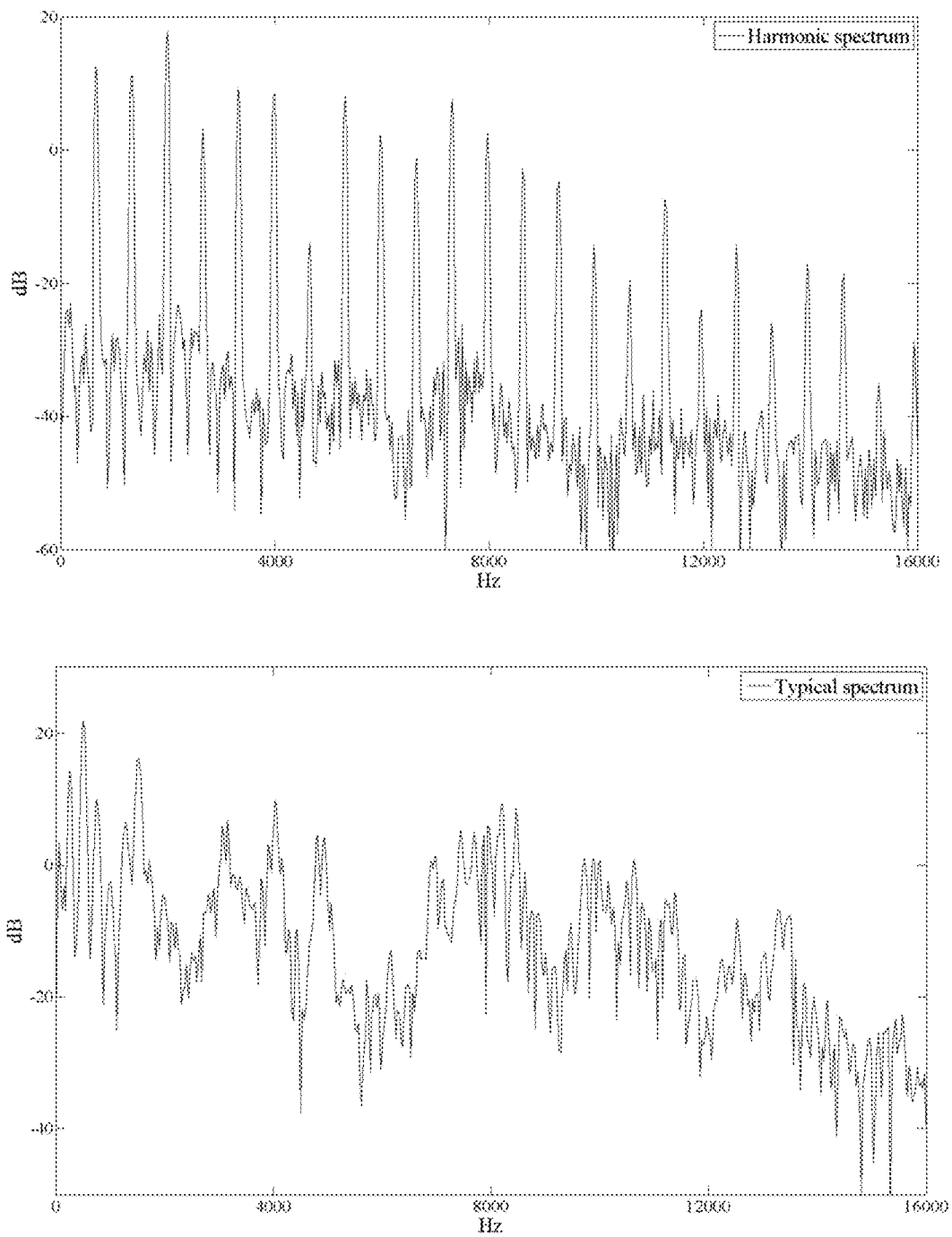
FIG. 1 is an example of harmonic spectrum targeted by the presented coding concept. For comparison the bottom figure illustrates audio spectrum with slowly varying spectral envelope.

The proposed technology is intended to be implemented in a codec, i.e. an encoder and a corresponding decoder (often abbreviated as a codec). An audio signal is received and encoded by the encoder. The resulting encoded signal is output, and typically transmitted to a receiver, where it is decoded by a corresponding decoder. In some cases, the encoded signal is instead stored in a memory for later retrieval.

The proposed technology may be applied to an encoder and/or decoder e.g. of a user terminal or user equipment, which may be a wired or wireless device. All the alternative devices and nodes described herein are summarized in the term "communication device", in which the solution described herein could be applied.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the term "wired device" may refer to any device configured or prepared for wired connection to a network. In particular, the wired device may be at least some of the above devices, with or without radio communication capability, when configured for wired connection.

The proposed technology may also be applied to an encoder and/or decoder of a radio network node. As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

Regarding the terminology concerning the frequency spectrum of the audio signal to be encoded, we will here try to explain some of the terms used. As described above, audio frequencies are often divided into a so-called "low band", (LB), or "low frequency band", (LF); and a so-called "high band", (HB), or "high frequency band" (HF). Typically, the high band is not encoded in the same way as the low band, but instead subjected to BWE. The BWE may comprise encoding of a spectral and a temporal envelope, as described above. However, a bandwidth extended high band may still be referred to as non-coded herein. In other words, a "non-coded high band" may still be associated with some coding of e.g. envelopes, but this coding may be assumed to be associated with far less bits than the coding in the coded regions.

Herein, the terminology "a first region" and "a second region" will be used, referring to parts of the audio spectrum. In a preferred embodiment, the first region may be assumed to be the low band and the second region may be assumed to be the high band, as in conventional audio coding using BWE. However, there may be more than two regions, and the regions may be differently configured.

The proposed technology is embedded in the context of an audio codec which is targeting signals with a strong harmonic content. An illustration of audio signals is presented in FIG. 1. The upper audio spectrum in FIG. 1 is an example of a harmonic spectrum, i.e. an example of a spectrum of an audio signal with a strong harmonic content. For comparison, the bottom spectrum in FIG. 1 illustrates an audio spectrum with a slowly varying spectral envelope.

In an exemplifying embodiment, the encoding and decoding is performed in frequency transformed domain using the Modified Discrete Cosine Transform (MDCT). The harmonic structure is modelled using a specific peak coding method in the so-called "low band", which is complemented with a vector quantizer (VQ) targeting the important low frequency (LF) coefficients of the MDCT spectrum and a BWE region where the higher frequencies are generated from the low band synthesis. An overview of this system is depicted in FIGS. 2a and 2b.

Figure 2A:
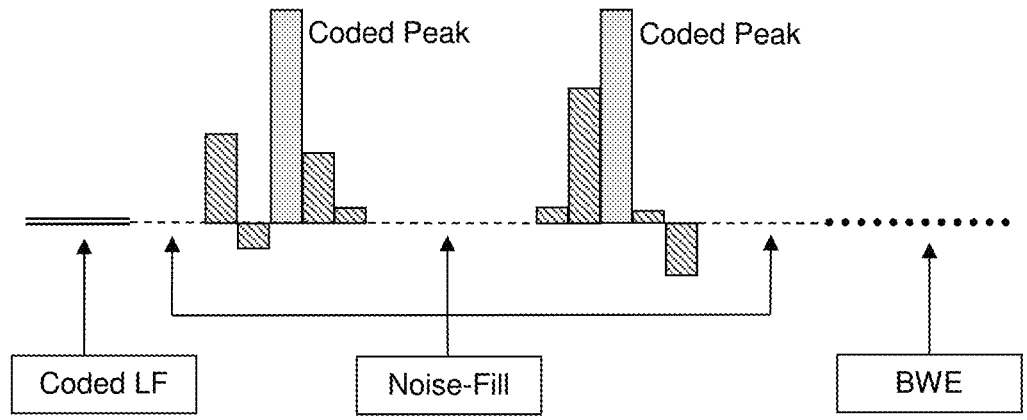
FIG. 2a is a structural view of the four different types of coding regions of MDCT spectrum.
Figure 2B:
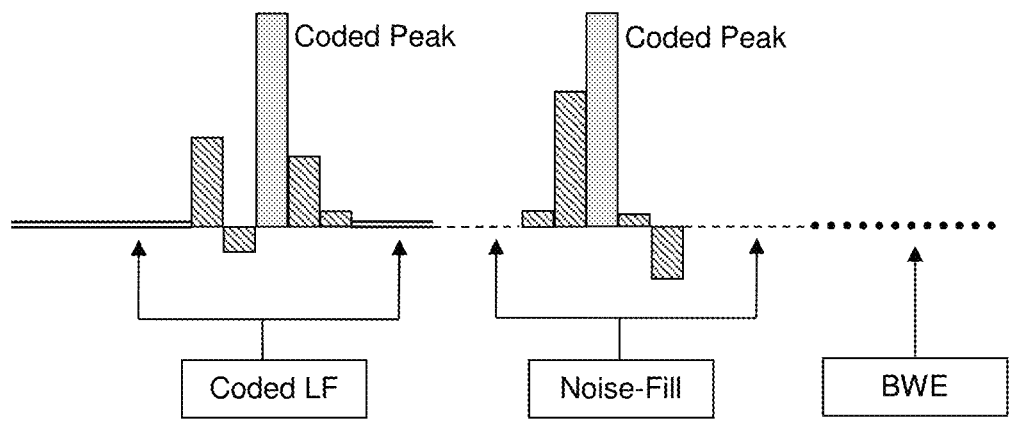
FIG. 2b is an example of LF coded region that models the space between spectral peaks.

FIG. 2a shows a structural view of the four different types of coding regions of an MDCT spectrum. In the low band, the spectral peaks are encoded using a peak based coding method. In the high band, BWE (dotted line) is applied, which may involve coding, i.e. some parametric representation, of information related to spectral envelope and temporal envelope. The region marked "Coded LF" in FIG. 2a (double line) is encoded using a gain shape coding method, i.e. not the same coding method as the one used for the peaks. The coded LF region is dynamic in the sense that it depends on the remaining amount of bits, out of a bit budget, that are available for coding when the peaks have been encoded. In FIG. 2b, the same regions as in FIG. 2a can be seen, but here it can also be seen that the coded LF region extends in between encoded peaks. In other words, also parts of the low band spectrum located between peaks may be modelled by the gain shape coding method, depending on peak positions of the target spectrum and the available number of bits. The parts of the spectrum comprising the encoded peaks are excluded from the gain shape coding of the lower frequency region, i.e. from the coded LF region. The parts of the low band which remain uncoded when the available bits are spent on peak coding and LF coding are subjected to noise fill (dashed line in FIG. 1).

Assuming the structure above, i.e. a first region where peaks and important non-peak parts/coefficients are encoded, and a second region, also possibly denoted BWE region, of which there is an a-priori assumption of not comprising as perceptually important information as the first region, a novel technique for adding coding of spectral components in the BWE region is proposed. The idea is to introduce a coded band in the BWE region (see FIG. 3) if certain requirements are fulfilled. More than one coded band could also be introduced when appropriate.

Since it is a target to maintain a structure of a coded region, such as a low frequency part of the spectrum, and a second region, such as a high frequency part of the spectrum that is bandwidth extended for most signals, a coded band in the second region should, in one embodiment, only be introduced if certain conditions regarding the band are fulfilled. The conditions, or criteria, for a candidate band, in a second region, evaluated for coding may be formulated as follows:

1. The energy in the candidate band, e.g. a frequency band in a high frequency part of the spectrum, should be relatively high compared to an energy estimate of a peak coded region, e.g. in the lower part of the frequency spectrum. This energy relation indicates an audible, and thus perceptually relevant, band in the second region.
2. The candidate band should have a relatively high energy compared to neighboring bands in the second region. This indicates a peaky structure in the second region that may not be modelled well with the BWE technique.
3. Resources, i.e. bits, for encoding the candidate band should not compete with more important components (cf. Coded LF in FIGS. 2a and 2b) in the encoding of parts of the coded region.

Exemplifying Embodiments

Figure 3:
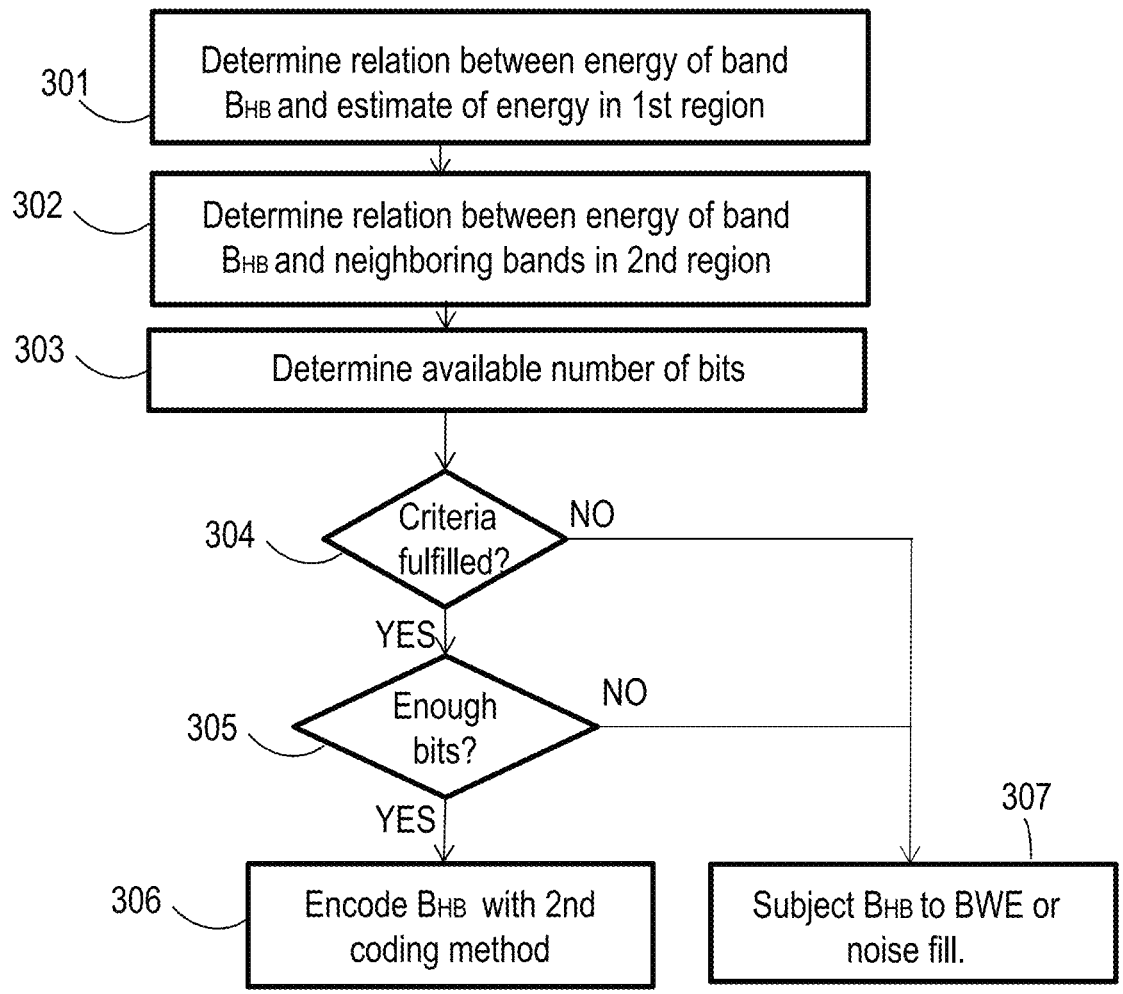
FIG. 3 is a flow chart illustrating a method according to an exemplifying embodiment

Below, exemplifying embodiments related to a method for encoding an audio signal will be described with reference to FIG. 3. The frequency spectrum of the audio signal is divided into at least a first and a second region, where at least the second region comprises a number of bands, and where spectral peaks in the first region are encoded by a first coding method. The method is to be performed by an encoder with a corresponding method in the decoder. The encoder and decoder may be configured for being compliant with one or more standards for audio coding and decoding. The method comprises, for a segment of the audio signal:

determining 301 a relation between an energy of a band in the second region and an energy estimate of the first region;

determining 302 a relation between the energy of the band in the second region and an energy of neighboring bands in the second region;

determining 303, 305 whether an available number of bits is sufficient for encoding at least one non-peak segment of the first region and the band in the second region; and, when the relations fulfill 304 a respective predetermined criterion and the number of bits is sufficient 305:

encoding 306 the band in the second region and the at least one segment of the first region using a second coding method; and otherwise:

subjecting 307 the band in the second region to BWE or noise fill.

The first region would typically be a lower part of the frequency spectrum than the second region. The first region may, as previously mentioned, be the so-called low band, and the second region may be the so-called high band. The regions do not overlap, and may be adjacent. Further regions are also possible, which may e.g. separate the first and second region.

The at least one segment of the first region, cf. part of "Coded LF" in FIGS. 2a and 2b, and the candidate band selected for encoding in the second region are encoded using the same second coding method. This second coding method may comprise vector quantization or pyramid vector quantization. Since the energy envelope or gains of the bands in the second region are already encoded to aid the BWE technology, is beneficial to complement this coding with a shape quantizer applied to the fine structure of the selected candidate band. This way, a gain-shape encoding of the selected candidate band is achieved. In some preferred embodiments, spectral peaks in the first region are encoded by a first coding method, as mentioned above. The first coding method is preferably a peak based coding method, such as described e.g. in 3GPP TS 26.445, section 5.3.4.2.5. A second coding method is exemplified in the same document in section 5.3.4.2.7.

Figure 4:
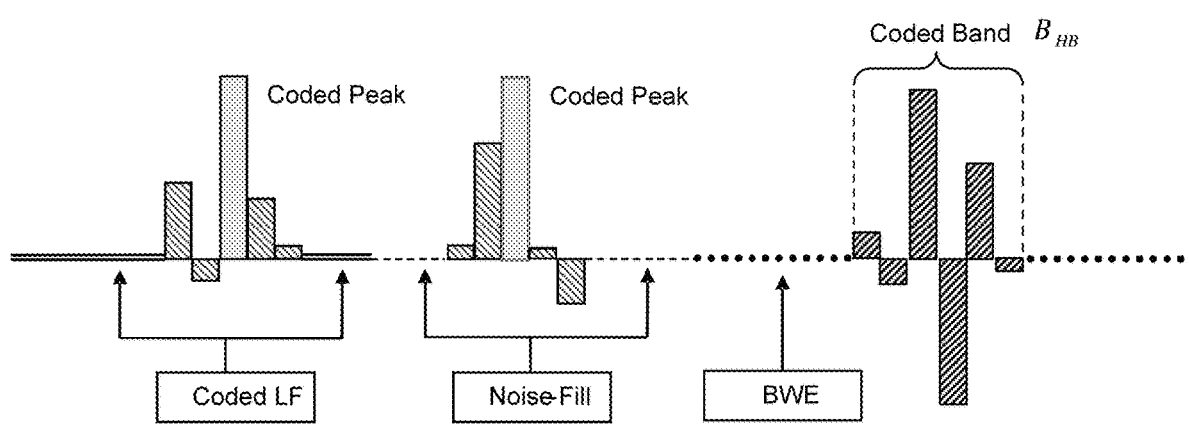
FIG. 4 illustrates an introduction of a coded band in the BWE region.

FIG. 4 illustrates a possible result of applying an embodiment of the method described above. In FIG. 4, a band, $B_{HB}$, in the second region is encoded instead of being subjected to BWE (as in FIGS. 2a and 2b), which would have been the case if not applying an embodiment of the method. The band $B_{HB}$ is encoded using the same coding method as used for the parts marked "Coded LF" in FIG. 4. The peaks in the first region, marked "coded peak", are, however, encoded using another coding method, which preferably is peak based. Note that since the content of the second region is not strictly populated using BWE or other spectral filling techniques, the a-priori assumption of a coded band and a non-coded band is no longer true. For this reason it may be more appropriate to call the filling strategy a noise-filling. The term noise-fill is more often used for spectral filling in regions which may appear anywhere in the spectrum and/or between coded parts of the spectrum.

The determining of relations between energies and the sufficiency of a number of bits available for coding corresponds to the three conditions, numbered 1-3, described above. Examples of how the determining may be performed will be described below. The evaluation is described for a candidate band in the second region.

Evaluation of Condition 1

The first condition relates to that the energy in the candidate band should have a certain relation to an energy estimate of a peak coded region. This relation is herein described as that the candidate band energy should be relatively high compared to the energy estimate of the first region.

Assuming, as an example, that the encoding is performed in frequency transformed domain using the Modified Discrete Cosine Transform, where the MDCT coefficients are calculated as:

$$Y(k) = \sqrt{\frac{2}{L}} \sum_{n=0}^{2L-1} \sin\left[\left(n+\frac{1}{2}\right)\frac{\pi}{L}\right]\cos\left[\left(n+\frac{1}{2}+\frac{L}{2}\right)\left(k+\frac{1}{2}\right)\frac{\pi}{L}\right]x(n), \quad (1)$$

where $x(n)$ denotes one frame of input audio samples with frame index i. Here, n, is an index of time-domain samples, and k the index of the frequency domain coefficients. For simplicity of notation, the frame index i will be omitted when all calculations are done within the same frame. In general, it should be understood that all calculations stemming from the input audio frame $x(n)$ will be executed on a frame basis and all following variables could be denoted with an index i.

The band log energies $E(j)$ of the second region, e.g. high band region, may be defined as:

$$E(j) = 2\log_2\left(\sqrt{\frac{1}{N_j} \sum_{k=b_j}^{b_j+N_j-1} Y^2(k)}\right), \quad (2)$$

where $b_j$ is the first coefficient in the band j and $N_j$ refers to the number of MDCT coefficients in the band. A typical number for a high frequency region is 24-64 coefficients per band. It should be noted that the 2 $\log_2$ (•) is merely an example which was found suitable in the targeted audio coding system and that other log bases and scaling factors may be used. Using other log bases and scaling factors would give different absolute log energy values and would require different threshold values, but the method would in other aspects remain the same.

As previously described, spectral peaks in the first region are preferably encoded using a peak based coding method. The coded peaks of the first region, e.g. lower frequency region, are in this example modeled using the peak position p(m), an amplitude, including sign, G(m) which is set to match the MDCT bin at the given position Y(p(m)), and a shape vector V(m) representing the neighboring peaks, e.g. the four neighboring MDCT bins, where m=1 ... $N_{peaks}$ and $N_{peaks}$ is the number of peaks used in the representation of the first region.

To evaluate the fulfillment of condition 1 above we would like to make an estimate of the energy in the first region, to compare to the candidate band energy. Assuming that the majority of the energy in the first region is contained within the modeled peaks, an estimate of the energy in the first region, $E_{peak}$ (i) of frame i can be derived as:

$$E_{peak}(i) = 2\log_2\left(\sum_{m=1}^{N_{peaks}} G(m)^2\right) \quad (3)$$

Now, condition 1 can be evaluated by setting a threshold for the envelope energy $E(j)$ of the candidate band j, as:

$$E(j) - E_{peak}(i) > T_1 \quad (5)$$

where $T_1$ is a threshold log energy for passing, i.e. fulfilling, condition 1. Due to the computational complexity of the log function, the following mathematically equivalent alternative may be used:

$$2^{E(j)/2} \cdot 2^{-T_1/2} > 2^{E_{peak}(i)/2} \quad (6)$$

or $$2^{E(j)/2} > 2^{E_{peak}(i)/2} \cdot 2^{T_1/2} \quad (7)$$

The threshold value should be set such that it corresponds to the perceptual importance of the band. The actual value may depend on the band structure. In one exemplary embodiment, a suitable value for $2^{T_1/2}$ was found to be $10^{-5}$.

Evaluation of Condition 2

The second condition relates to that the energy in the candidate band should have a certain relation to an energy of neighboring bands in the second region. This relation is expressed herein, as that the candidate band should have a relatively high energy compared to neighboring bands in the second region.

An example of how to evaluate fulfillment of condition 2 is to compare the log energy of the candidate band to the average log energy of the entire second region, e.g. high band. First, the average log energy of the second region may be defined as:

$$\bar{E} = \frac{1}{N_{HB}} \sum_{j=1}^{N_{HB}} E(j) \quad (8)$$

Then, an expression for condition 2 may be formulated as:

$$E(j) - \bar{E} > T_2 \quad (9)$$

where $T_2$ denotes the log energy threshold for passing the condition 2. Equivalently, as for condition 1, this may be formulated in energy domain instead of log domain, cf. equation (6), if this is seen as beneficial from a computational complexity aspect. In an exemplary embodiment, a suitable value for $T_2$ was found to be 3. As an alternative to using the average log energy of the entire second region, only parts of the second region may be used, e.g. a number of bands surrounding the candidate band.

Evaluation of Condition 3

The third condition relates to whether an available number of bits is sufficient for encoding at least one non-peak segment of the first region and the band in the second region. Otherwise the band in the second region should not be coded. Condition 3 relates to the targeted coding method, denoted "second coding method" above, which is a gain shape coding. The general VQ targeted for the Coded LF region, i.e. non-peak parts of the first region, is according to an embodiment configured to cover also selected bands in the second region, e.g. high frequency region. However, since the first region, typically a low frequency region, is sensitive for the MDCT domain coding, it should be ensured that some resources, bits, are allocated to encode at least part of this frequency range.

Since the preferred general pyramid vector quantizer (PVQ) which is targeted for the coding of non-peak parts of the first region (cf. "Coded LF" in FIGS. 2a and 2b) is operating on a target spectrum divided into bands, this requirement is fulfilled by ensuring that at least one band is allocated for the first region, i.e.:

$$N_{band} \geq 1 \quad (10)$$

where $N_{band}$ denotes the number of bands in the target signal for the Coded LF part. These bands are not the same type of band as the bands in the second region. The band $N_{band}$ here is a band with a width given by the encoder, and the band comprises a part of the first region which is not encoded by a peak coding method.

In case there are enough available bits to encode both at least one non-peak part of the first region, and a selected band, which fulfills conditions 1-2 above, the selected band may be encoded together with the at least one non-peak part of the first region using the second coding method (gain shape). Another useful condition for avoiding waste of resources is to ensure that the bit rate for the selected band is high enough to represent the band with acceptable quality. If not, the bits spent on encoding the selected band will be wasted, and would be better spent on coding more of the low frequency part of the first region (cf. more Coded LF in FIG. 2a) In an exemplifying embodiment, the coding of a non-peak part of the first region is handled using PVQ, which has an explicit relation between the number of pulses, vector length and the required bitrate defined by the function pulses2bits ($W_j, P_{min}$) where $W_j$ denotes the bandwidth of the selected band and $P_{min}$ is the minimum number of pulses which should be represented. Assume $B_{last}$ denotes the number of bits allocated for the last band in the target vector for the PVQ encoder, then the condition for avoiding wasting resources may be written as:

$$B_{last} > \text{pulses2bits}(W_j, P_{min}) \quad (11)$$

The minimum number of pulses $P_{min}$ is a tuning parameter, but it must be at least $P_{min} \geq 1$. Equations (10) and (11) together fulfill the condition 3 in an exemplifying embodiment.

A novel part of embodiments described herein is a decision logic for evaluation of whether to encode a band in a BWE region or not. By BWE region is here meant a region, defined e.g. in frequency, which an encoder without the herein suggested functionality would have subjected to BWE. For example the BWE region could be frequencies above 5.6 kHz, or above 8 kHz.

Exemplifying embodiments described above suggests a structure where the so-called "low band" is coded and the so-called "high band" is extended from the low band. The terms "low band" and "high band" refer to parts of a frequency spectrum which is divided at a certain frequency. That is, a frequency spectrum divided into a lower part, a "low band" and a higher part, a "high band" at a certain frequency, e.g. 5, 6 or 8 kHz. The solution described herein is, however, not limited to such a frequency partition, but may also be applied to other distributions of coded and non-coded, i.e. estimated, regions, where the coded and estimated regions or parts are decided e.g. based on a-priori knowledge about the source and perceptual importance of the signal at hand.

An exemplifying embodiment of a method for encoding an audio signal comprises receiving an audio signal and further analyzing at least a portion of the audio signal. The method further comprises determining, based on the analysis, whether to encode a high band region of a frequency spectrum of the audio signal together with a low band region of the frequency spectrum. The exemplifying method further comprises encoding the audio signal for transmission over a link in a communication network based on the determination of whether to encode the high band region.

The analysis described above may also be performed on the quantized and reconstructed parameters in the encoder. The log energies E(j) would in that case be substituted with their quantized counterpart Ê(j) in Equation (8) and the peak gains G(m) would be replaced with the quantized peak gains Ĝ(m) in Equation (3). Using the quantized parameters permits the method described above to be implemented the same way in the encoder and corresponding decoder, since the quantized parameters are available for both of them. That is, the method described above is also performed in the decoder, in order to determine how to decode and reconstruct the audio signal. The benefit of this setup is that no additional information needs to be conveyed from the encoder to the decoder, indicating whether a band in the second region has been encoded or not. A solution where information is conveyed, which indicates whether a band in the second region is coded or not is also possible.

A method for decoding an audio signal, corresponding to the method for encoding an audio signal described above, will be described below. As before, a frequency spectrum of the audio signal is divided into at least a first and a second region, where at least the second region comprises a number of bands, and where spectral peaks in the first region are decoded using a first coding method. The method, which is to be performed by a decoder comprises, for a segment of the audio signal:

determining a relation between an energy of a band in the second region and an energy estimate of the first region;
determining a relation between the energy of the band in the second region and an energy of neighboring bands in the second region;
determining whether an available number of bits is sufficient for encoding at least one non-peak segment of the first region and the band in the second region. The method further comprises:
when the relations fulfill a respective predetermined criterion (304) and the number of bits is sufficient:
decoding a band in the second region and the at least one segment of the first region using a second coding method; and otherwise reconstructing the band in the second region based on BWE or noise fill.

Implementations

The method and techniques described above may be implemented in encoders and/or decoders, which may be part of e.g. communication devices.

Figure 5A:
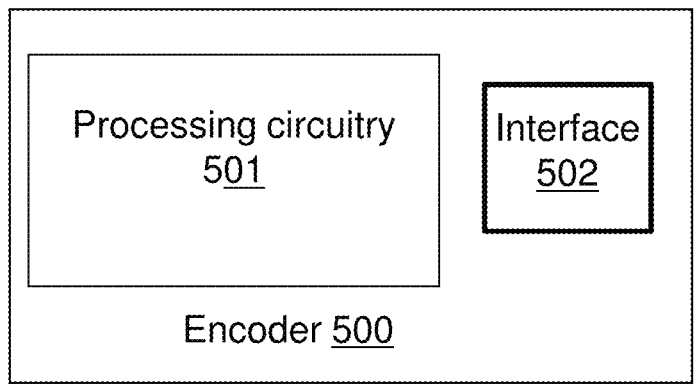
FIGS. 5a-c illustrate implementations of an encoder according to exemplifying embodiments.
Figure 5B:
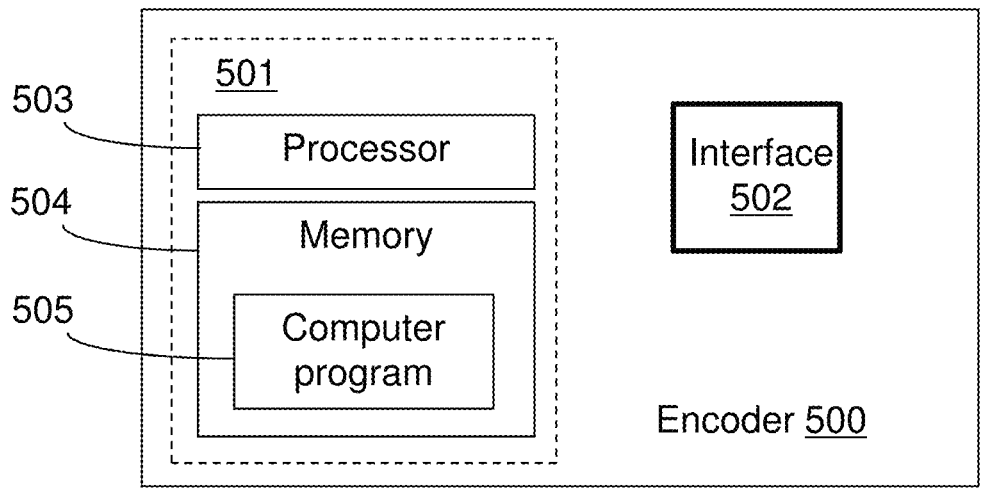
Figure 5C:
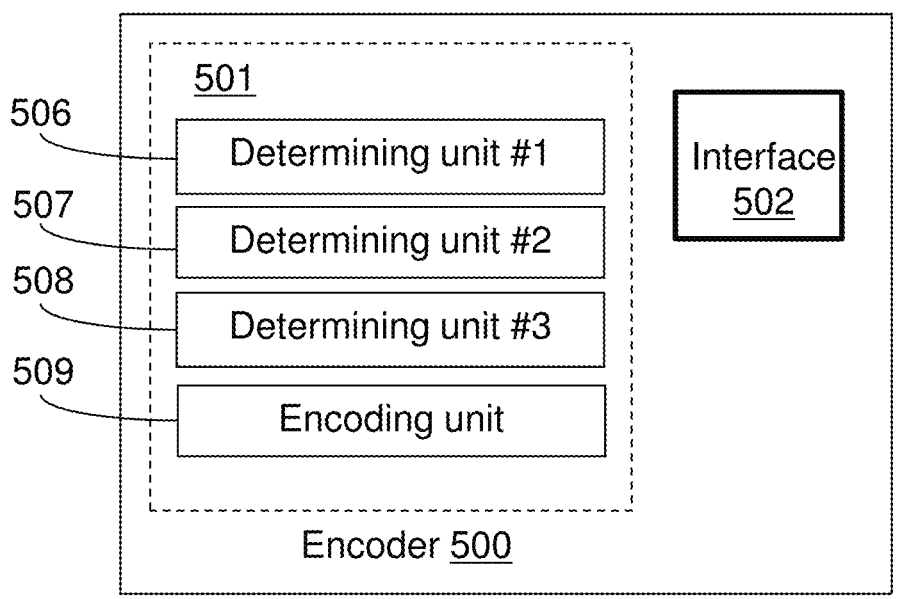

Encoder, FIGS. 5a-5c

An exemplifying embodiment of an encoder is illustrated in a general manner in FIG. 5a. By encoder is referred to an encoder configured for coding of audio signals. The encoder could possibly further be configured for encoding other types of signals. The encoder 500 is configured to perform at least one of the method embodiments described above with reference e.g. to FIG. 3. The encoder 500 is associated with the same technical features, objects and advantages as the previously described method embodiments. The encoder may be configured for being compliant with one or more standards for audio coding. The encoder will be described in brief in order to avoid unnecessary repetition.

The encoder may be implemented and/or described as follows:

The encoder 500 is configured for encoding of an audio signal, where a frequency spectrum of the audio signal is divided into at least a first and a second region, where at least the second region comprises a number of bands, and where spectral peaks in the first region are encoded by a first coding method. The encoder 500 comprises processing circuitry, or processing means 501 and a communication interface 502. The processing circuitry 501 is configured to cause the encoder 500 to, for a segment of the audio signal: determine a relation between an energy of a band in the second region and an energy estimate of the first region. The processing circuitry 501 is further configured to cause the encoder to determining a relation between the energy of the band in the second region and an energy of neighboring bands in the second region. The processing circuitry 501 is further configured to cause the encoder to determine whether an available number of bits is sufficient for encoding at least one non-peak segment of the first region and the band in the second region. The processing circuitry 501 is further configured to cause the encoder to, when the relations fulfill a respective predetermined criterion and the number of bits is sufficient, encoding the band in the second region and the at least one segment of the first region using a second coding method. Otherwise, when at least one of the relations does not fulfill the predetermined criterion and/or when the number of bits is non-sufficient, the band in the second region is subjected to BWE or noise fill. The communication interface 502, which may also be denoted e.g. Input/Output (I/O) interface, includes an interface for sending data to and receiving data from other entities or modules.

The processing circuitry 501 could, as illustrated in FIG. 5b, comprise processing means, such as a processor 503, e.g. a CPU, and a memory 504 for storing or holding instructions. The memory would then comprise instructions, e.g. in form of a computer program 505, which when executed by the processing means 503 causes the encoder 500 to perform the actions described above.

An alternative implementation of the processing circuitry 501 is shown in FIG. 5c. The processing circuitry here comprises a first determining unit 506, configured to cause the encoder 500 to: determine a relation between an energy of a band in the second region and an energy estimate of the first region. The processing circuitry further comprises a second determining unit 507 configured to cause the encoder to determine a relation between the energy of the band in the second region and an energy of neighboring bands in the second region. The processing circuitry further comprises a third determining unit 508, configured to cause the encoder to determine whether an available number of bits is sufficient for encoding at least one non-peak segment of the first region and the band in the second region. The processing circuitry further comprises a coding unit, configured to cause the encoder to, when the relations fulfill a respective predetermined criterion and the number of bits is sufficient, encode the band in the second region and the at least one segment of the first region using a first coding method. The processing circuitry 501 could comprise more units, such as a deciding unit configured to cause the encoder to decide whether the determined relations fulfill the criteria or not This task could alternatively be performed by one or more of the other units.

The encoders, or codecs, described above could be configured for the different method embodiments described herein, such as using different gain shape coding methods as the second coding method; different peak coding methods for coding the peaks in the first region, operating in different transform domains, etc.

The encoder 500 may be assumed to comprise further functionality, for carrying out regular encoder functions.

Figure 6:
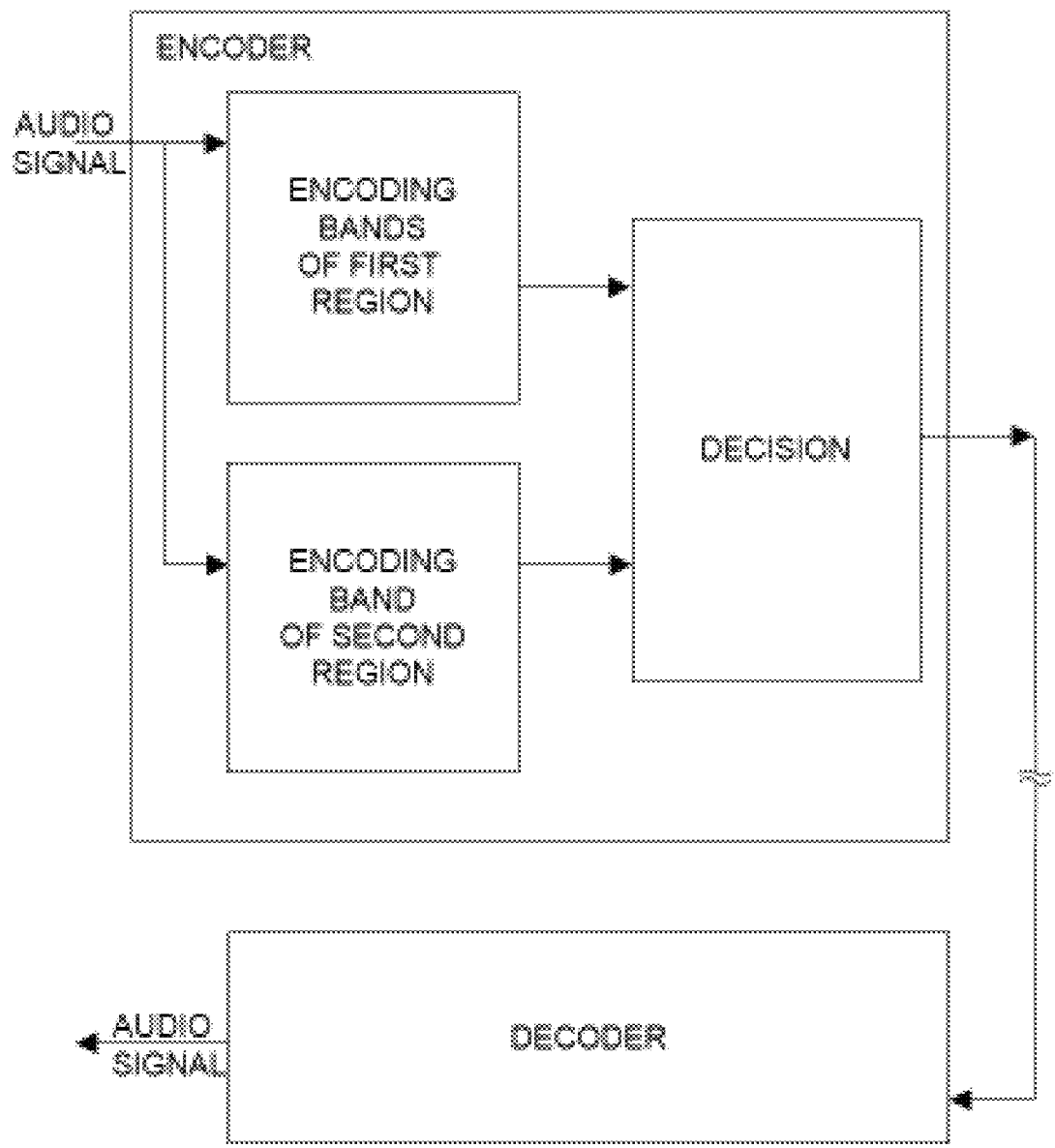
FIG. 6 illustrates an embodiment of an encoder.

FIG. 6 illustrates an embodiment of an encoder. An audio signal is received and bands of a first region, typically the low frequency region, are encoded. Also, at least one band of a second region, typically the high frequency region, exclusive to the first region, is encoded. Depending on the conditions discussed further above, it can be decided whether or not the coding of the band in the second region is included in the final coded signal. The final coded signal is typically provided to a receiving party, where the coded signal is decoded into an audio signal. The UE or network node may also include radio circuitry for communication with one or more other nodes, including transmitting and/or receiving information.

Figure 7:
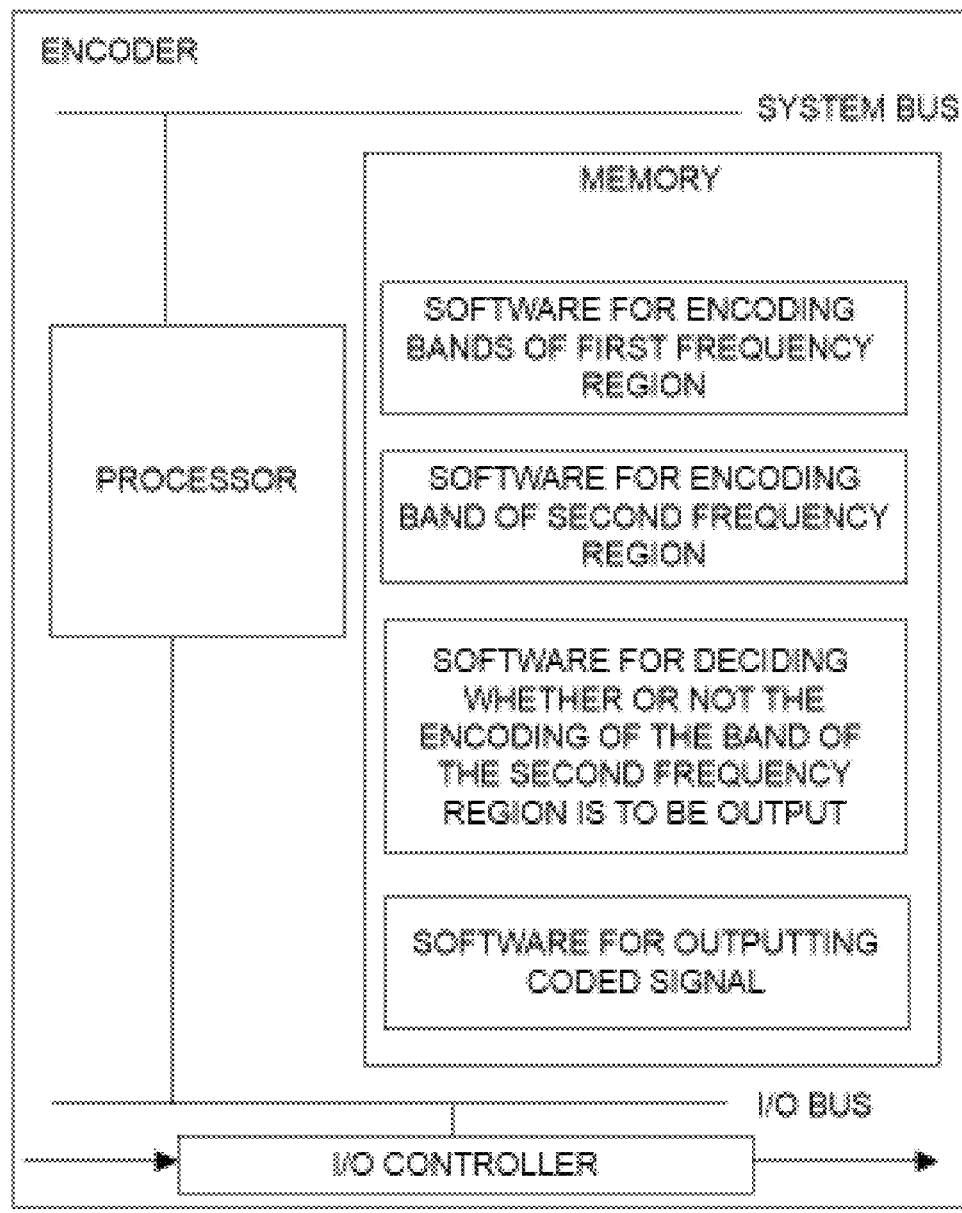
FIG. 7 illustrates an embodiment of a computer implementation of an encoder.
Figure 8:
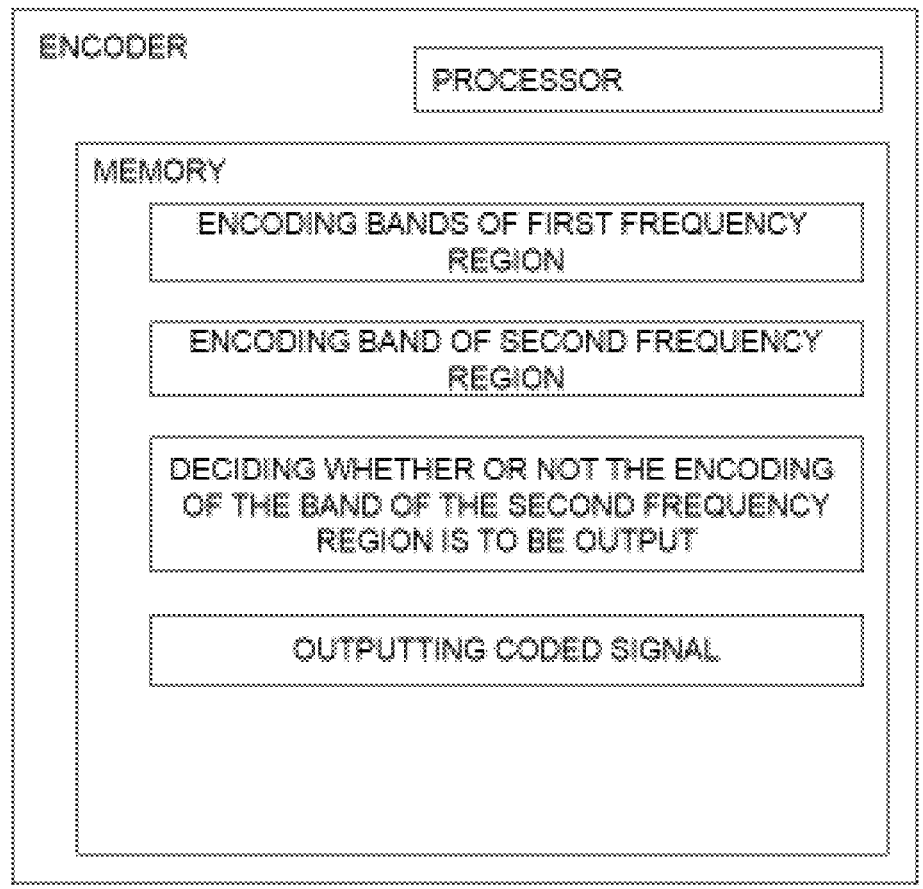
FIG. 8 is a schematic block diagram illustrating an embodiment of an encoder comprising a group of function modules.
Figure 9:
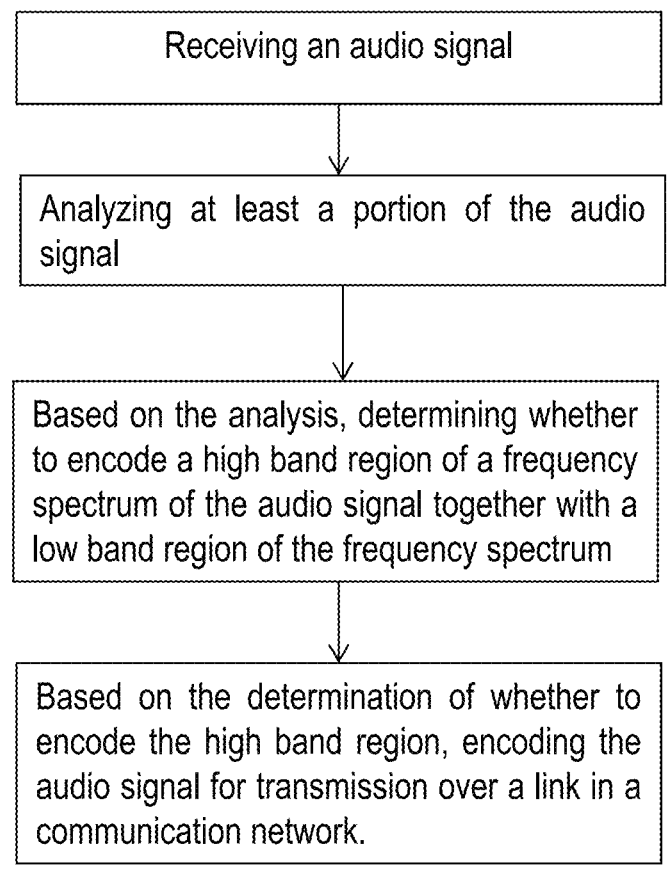
FIG. 9 illustrates an embodiment of an encoding method

In the following, an example of a computer implementation will be described with reference to FIG. 7. The encoder comprises processing circuitry such as one or more processors and a memory. In this particular example, at least some of the steps, functions, procedures, modules and/or blocks described herein are implemented in a computer program, which is loaded into the memory for execution by the processing circuitry. The processing circuitry and memory are interconnected to each other to enable normal software execution. An optional input/output device may also be interconnected to the processing circuitry and/or the memory to enable input and/or output of relevant data such as input parameter(s) and/or resulting output parameter(s). An encoder could alternatively be implemented using function modules, as illustrated in FIG. 8.

An exemplifying embodiment of an encoder for encoding an audio signal could be described as follows:

The encoder comprises a processor; and a memory for storing instructions that, when executed by the processor, cause the encoder to: receive an audio signal; analyze at least a portion of the audio signal; and to: based on the analysis, determine whether to encode a high band region of a frequency spectrum of the audio signal together with a low band region of the frequency spectrum; and further to: based on the determination of whether to encode the high band region, encode the audio signal for transmission over a link in a communication network.

The encoder could be comprised in a user equipment for operation in a wireless communication network.

The term 'computer' should be interpreted in a general sense as any system or device capable of executing program code or computer program instructions to perform a particular processing, determining or computing task.

In a particular embodiment, the computer program comprises instructions, which when executed by at least one processor, cause the processor(s) to encode bands of a first frequency region, to encode at least one band of a second region, and depending on specified conditions to decide whether or not the coding of the band in the second region is to be included in the final coded signal.

It will be appreciated that the methods and devices described herein can be combined and re-arranged in a variety of ways. For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The proposed technology provides an encoder usable in an UE or network node configured to encode audio signals, wherein the encoder is configured to perform the necessary functions.

In a particular example, the encoder comprises a processor and a memory, the memory comprising instructions executable by the processor, whereby the apparatus/processor is operative to perform the encoding and decision steps.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

The software or computer program may thus be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blueray disc, a Universal Serial Bus, USB, memory, a Hard Disk Drive, HDD storage device, a flash memory, a magnetic tape, or any other conventional memory device. The computer program may thus be loaded into the operating memory of a computer or equivalent processing device for execution by the processing circuitry thereof. That is, the software could be carried by a carrier, such as an electronic signal, an optical signal, a radio signal, or a computer readable storage medium before and/or during the use of the computer program in the network nodes.

For example, the computer program stored in memory includes program instructions executable by the processing circuitry, whereby the processing circuitry is able or operative to execute the above-described steps, functions, procedure and/or blocks. The encoder is thus configured to perform, when executing the computer program, well-defined processing tasks such as those described herein. The computer or processing circuitry does not have to be dedicated to only execute the above-described steps, functions, procedure and/or blocks, but may also execute other tasks.

As indicated herein, the encoder may alternatively be defined as a group of function modules, where the function modules are implemented as a computer program running on at least one processor. FIG. 8 is a schematic block diagram illustrating an example of an encoder comprising a processor and an associated memory. The computer program residing in memory may thus be organized as appropriate function modules configured to perform, when executed by the processor, at least part of the steps and/or tasks described herein. An example of such function modules is illustrated in FIG. 6.

FIG. 8 is a schematic block diagram illustrating an example of an encoder comprising a group of function modules.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:
1. A method for encoding an audio signal, the method comprising:
   encoding spectral peak segments in a first region of a frequency spectrum of the audio signal using a first coding method;
   responsive to encoding the spectral peak segments in the first region, determining whether an available number of bits out of a total number of bits for encoding the audio signal is sufficient for encoding a band in a second region of the frequency spectrum of the audio signal using a second coding method different from the first coding method;
   determining a first relation between an energy of the band in the second region and energies of spectral peaks in the first region;
   determining a second relation between the energy of the band in the second region and an average energy of the second region; and
   responsive to determining the available number of bits is sufficient for encoding the band in the second region and determining the first and second relations fulfil a predetermined criterion, encoding the band in the second region using the second coding method.

2. The method of claim 1, further comprising:
   responsive to encoding the spectral peak segments in the first region, determining whether the available number of bits out the total number of bits for encoding the audio signal is sufficient for encoding at least one non-peak segment of the first region using the second coding method; and
   responsive to determining the available number of bits is sufficient for encoding the at least one non-peak segment of the first region, encoding the at least one non-peak segment in the first region using the second coding method.

3. The method of claim 1, wherein determining the first and second relations fulfil a predetermined criterion comprises:
   determining the first relation fulfils the predetermined criterion based on a comparison of an energy of the band in the second region and energies of the spectral peaks in the first region; and
   determining the second relation fulfils the predetermined criterion based on a comparison of the energy of the band in the second region to an average energy of the second region.

4. The method of claim 1, wherein encoding the band in the second region comprises encoding at least one coefficient of the band in the second region within the number of bits that are available.

5. The method of claim 1, further comprising:
   responsive to determining the first and second relations do not fulfil a predetermined criterion or determining the available number of bits is not sufficient for encoding the band in the second region, transmitting parameters toward a decoding apparatus to subject the band in the second region to BandWidth Extension (BWE) or noise fill during decoding.

6. The method of claim 5, wherein the parameters comprise at least one of a gain and an envelope energy of the band in the second region.

7. The method of claim 1, wherein the first region is a lower part of the frequency spectrum than the second region.

8. The method of claim 1, wherein the first coding method is not used to encode the band in the second region.

9. The method of claim 1, wherein each spectral peak segment comprises a peak and a determined number of neighboring modified Discrete Cosine Transform (MDCT) bins.

10. The method of claim 1, wherein the first coding method comprises encoding of a peak position, an amplitude and sign of the peak position, and a shape vector representing neighbouring Modified Discrete Cosine Transform (MDCT) bins.

11. The method of claim 1, wherein the second coding method comprises vector quantization or pyramid vector quantization.

12. An apparatus for encoding an audio signal, the apparatus being configured to perform operations comprising:
   encoding spectral peak segments in a first region of a frequency spectrum of the audio signal using a first coding method;
   responsive to encoding the spectral peak segments in the first region, determining whether an available number of bits out of a total number of bits for encoding the audio signal is sufficient for encoding a band in a second region of the frequency spectrum of the audio signal using a second coding method different from the first coding method;
   determining a first relation between an energy of the band in the second region and energies of spectral peaks in the first region;
   determining a second relation between the energy of the band in the second region and an average energy of the second region; and
   responsive to determining the available number of bits is sufficient for encoding the band in the second region and determining the first and second relations fulfil a predetermined criterion, encoding the band in the second region using the second coding method.

13. The apparatus of claim 12, further configured to perform operations comprising:
   responsive to encoding the spectral peak segments in the first region, determining whether the available number of bits out the total number of bits for encoding the audio signal is sufficient for encoding at least one non-peak segment of the first region using the second coding method; and
   responsive to determining the available number of bits is sufficient for encoding the at least one non-peak segment of the first region, encoding the at least one non-peak segment in the first region using the second coding method.

14. The apparatus of claim 12, wherein determining the first and second relations fulfil a predetermined criterion comprises:
   determining the first relation fulfils the predetermined criterion based on a comparison of an energy of the band in the second region and energies of the spectral peaks in the first region; and
   determining the second relation fulfils the predetermined criterion based on a comparison of the energy of the band in the second region to an average energy of the second region.

15. The apparatus of claim 12, wherein encoding the band in the second region comprises encoding at least one coefficient of the band in the second region within the number of bits that are available.

16. The apparatus of claim 12, further configured to perform operations comprising:
responsive to determining the first and second relations do not fulfil a predetermined criterion or determining the available number of bits is not sufficient for encoding the band in the second region, transmitting parameters toward a decoding apparatus to subject the band in the second region to BandWidth Extension (BWE) or noise fill during decoding.

17. The apparatus of claim 12, wherein the first region is a lower part of the frequency spectrum than the second region.

18. The apparatus of claim 12, wherein the first coding method is not used to encode the band in the second region.

19. The apparatus of claim 12, wherein the first coding method comprises encoding of a peak position, an amplitude and sign of the peak position, and a shape vector representing neighbouring Modified Discrete Cosine Transform (MDCT) bins.

20. A computer program product comprising a non-transitory computer readable storage medium storing instructions which, when executed by at least one processor of an apparatus, causes the processor to perform operations comprising:

encoding spectral peak segments in a first region of a frequency spectrum of an audio signal using a first coding method;

responsive to encoding the spectral peak segments in the first region, determining whether an available number of bits out of a total number of bits for encoding the audio signal is sufficient for encoding a band in a second region of the frequency spectrum of the audio signal using a second coding method different from the first coding method;

determining a first relation between an energy of the band in the second region and energies of spectral peaks in the first region;

determining a second relation between the energy of the band in the second region and an average energy of the second region; and responsive to determining the available number of bits is sufficient for encoding the band in the second region and determining the first and second relations fulfil a predetermined criterion, encoding the band in the second region using the second coding method.

* * * * *